(12) United States Patent
Zhou

(10) Patent No.: US 11,425,294 B2
(45) Date of Patent: Aug. 23, 2022

(54) IMAGING DEVICE HAVING POLARIZER PART, USER EQUIPMENT INCLUDING THE SAME, AND METHOD AND STORAGE MEDIUM FOR ACQUIRING AMBIENT LIGHT USING THE SAME

(71) Applicant: Beijing Xiaomi Mobile Software Co., Ltd., Beijing (CN)

(72) Inventor: Longlong Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 25 days.

(21) Appl. No.: 16/985,582

(22) Filed: Aug. 5, 2020

(65) Prior Publication Data

US 2021/0306533 A1 Sep. 30, 2021

(30) Foreign Application Priority Data

Mar. 27, 2020 (CN) .......................... 202010231231.9

(51) Int. Cl.
*H04N 5/225* (2006.01)
*G02B 27/28* (2006.01)
*H04N 5/235* (2006.01)

(52) U.S. Cl.
CPC ......... *H04N 5/2257* (2013.01); *G02B 27/286* (2013.01); *H04N 5/2351* (2013.01)

(58) Field of Classification Search
CPC .. H04N 5/2257; H04N 5/2351; G02B 27/286; G01J 1/0295; G01J 1/0429; G01J 1/4228; G01J 1/4204
See application file for complete search history.

(56) References Cited

U.S. PATENT DOCUMENTS 9,612,152 B2 * 4/2017 deJong ..................... G01J 1/32
2006/0181673 A1 * 8/2006 Ohashi ................. G09G 3/3406
349/199

(Continued)

FOREIGN PATENT DOCUMENTS

CN 103780812 A 5/2014
CN 108769306 A 11/2018

(Continued)

OTHER PUBLICATIONS

European Search Report in the European Application No. 20193882.6, dated Feb. 26, 2021.

(Continued)

*Primary Examiner* — Luong T Nguyen
(74) *Attorney, Agent, or Firm* — Finnegan, Henderson, Farabow, Garrett & Dunner, L.L.P.

(57) ABSTRACT

An imaging device, to be installed under a display having a first polarizer part, includes: at least one first light sensor element; at least one second light sensor element; and a second polarizer part provided upstream of the at least one second light sensor element along a direction in which light is incident on the at least one second light sensor element, wherein polarization orientation of the first polarizer part is at a preset angle with respect to polarization orientation of the second polarizer part; the at least one first light sensor element receives screen light emitted by the display and first polarized ambient light incident through the first polarizer part; and the at least one second light sensor element receives the screen light emitted by the display and second polarized ambient light incident through the first polarizer part and the second polarizer part.

7 Claims, 7 Drawing Sheets

(56) References Cited

U.S. PATENT DOCUMENTS

2008/0165267 A1* 7/2008 Cok ............... H04N 7/144
                                                348/333.01
2010/0268828 A1   10/2010 Pahlavan et al.
2015/0122978 A1    5/2015 Dejong et al.
2016/0274450 A1*  9/2016 Usukura ............ G02B 5/02

FOREIGN PATENT DOCUMENTS

CN      109036163 A    12/2018
JP      2017182070 A   10/2017

OTHER PUBLICATIONS

Haselton Todd, Chinese company shows phone with camera hidden behind the screen, Jun. 26, 2019, retrieved from https://www.cnbc.com/2019/06/26/oppo-shows-phone-camera-that-hides-under-the-screen, on Feb. 18, 2021, 7 pages.
Examination Report dated Nov. 22, 2021, from the Intellectual Property of India issued in counterpart Indian Application No. 202044035918.
3GPP TR 26.9xy V0.2.0 (Nov. 2011), 3rd Generation Partnership Project; Technical Specification Group Services and System Aspects; Mobile 3D Video Coding (Release 11).
First Office Action of Chinese Application No. 202010231231.9, dated Apr. 20, 2022.

* cited by examiner

IMAGING DEVICE HAVING POLARIZER PART, USER EQUIPMENT INCLUDING THE SAME, AND METHOD AND STORAGE MEDIUM FOR ACQUIRING AMBIENT LIGHT USING THE SAME

CROSS-REFERENCE TO RELATED APPLICATIONS

This application is based on, and claims priority to Chinese Patent Application No. 202010231231.9 filed on Mar. 27, 2020, the content of which is hereby incorporated by reference in its entirety.

TECHNICAL FIELD

The present disclosure relates to the technical field of terminals, and more particularly, to an imaging device, user equipment, a method for acquiring ambient light, and a storage medium.

BACKGROUND

With progress of technology, user equipment (UE), such as a mobile phone, has an increasingly high screen ratio. A screen ratio becomes a major selling point of a mobile phone. A full-screen mobile phone gradually becomes a mainstream of a future mobile phone market.

At present, various mobile phone manufacturers are trying actively to develop an off-screen camera to achieve a full screen. However, screen light may interfere with a front camera of a mobile phone, making it difficult to achieve a true screen ratio of 100% while acquiring a good photographing result.

SUMMARY

According to a first aspect of embodiments of the present disclosure, an imaging device, to be installed under a display having a first polarizer part, includes: at least one first light sensor element; at least one second light sensor element; and a second polarizer part provided upstream of the at least one second light sensor element along a direction in which light is incident on the at least one second light sensor element, wherein polarization orientation of the first polarizer part is at a preset angle with respect to polarization orientation of the second polarizer part, the at least one first light sensor element receives screen light emitted by the display and first polarized ambient light incident through the first polarizer part, and the at least one second light sensor element receives the screen light emitted by the display and second polarized ambient light incident through the first polarizer part and the second polarizer part.

According to a second aspect of embodiments of the present disclosure, user equipment (UE) includes: a processor; a display having a first polarizer part; and an imaging device installed under the display and including: at least one first light sensor element; at least one second light sensor element; and a second polarizer part provided upstream of the at least one second light sensor element along a direction in which light is incident on the at least one second light sensor element, wherein polarization orientation of the first polarizer part is at a preset angle with respect to polarization orientation of the second polarizer part; the at least one first light sensor element receives screen light emitted by the display and first polarized ambient light incident through the first polarizer part; and the at least one second light sensor element receives the screen light emitted by the display and second polarized ambient light incident through the first polarizer part and the second polarizer part; and wherein the processor is electrically connected to the at least one first light sensor element and the at least one second light sensor element of the imaging device.

According to a third aspect of embodiments of the present disclosure, a method for acquiring ambient light includes: acquiring first light sensor data collected by at least one first light sensor element, the first light sensor data including a first electric signal, the first electric signal corresponding to screen light emitted by a display and first polarized ambient light incident through a first polarizer part of the display received by the at least one first light sensor element; acquiring second light sensor data collected by at least one second light sensor element, the second light sensor data including a second electric signal, the second electric signal corresponding to the screen light emitted by the display, and second polarized ambient light incident through the first polarizer part of the display and a second polarizer part of an imaging device received by the at least one second light sensor element; and acquiring, according to the second light sensor data and the first light sensor data, third light sensor data as an electric signal corresponding to ambient light for generating an image.

The above general description and detailed description below are exemplary and explanatory, and do not limit the subject disclosure.

BRIEF DESCRIPTION OF THE ACCOMPANYING DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods with aspects related to the present disclosure as recited in the appended claims.

At present, a full screen is a selling point of user equipment (UE), such as a mobile phone. To achieve a true screen ratio of 100%, it is generally needed to reduce impact of screen light emitted by a screen of the mobile phone on a photographing result acquired using an off-screen camera. According to a related research, a full screen may impact a photographing result of a front camera mainly in two aspects as follows. Firstly, a display may be of low transmittance and, thus, the off-screen camera may not be able to acquire enough natural light. Secondly, the display itself may emit light, rendering a photo by the off-screen camera whitish and blurry.

Figure 1:
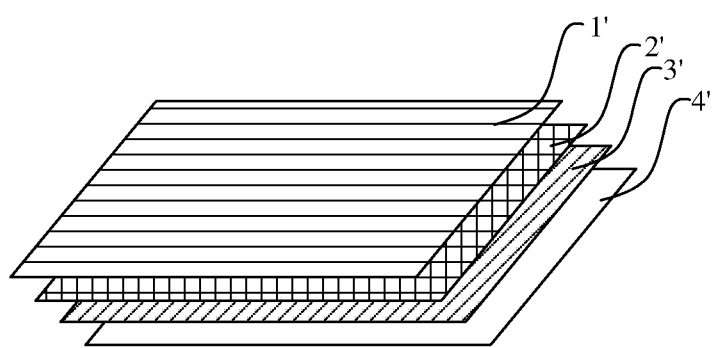
FIG. 1 is a schematic diagram of a display in some embodiments.

In some embodiments, transmittance of the display may be increased by increasing a size of a light sensor element, an amount of light sensed, etc. For example, an organic light-emitting diode (OLED) display of high transmittance may be used to ensure that an off-screen camera acquires enough natural light. Referring to FIG. 1, to prevent screen reflection when a user uses an OLED display, a first polarizer part 1' may be provided at a topmost layer of the OLED display, based on the orientation in FIG. 1. An Encap glass 2', an organic self-luminous layer 3', and a thin film transistor (TFT) glass substrate 4' may be provided successively under the first polarizer part. Ambient natural light may pass through the first polarizer part 1' of the OLED display, and then may be incident into the off-screen camera.

In some embodiments, impact of screen light emitted by an OLED display on an off-screen camera may be eliminated by a software algorithm. On one hand, a simple algorithm may neither be robust nor of high computing efficiency, failing to efficiently eliminate impact of light emitted by the OLED display per se on the off-screen camera. On the other hand, an overly complex algorithm may lower a processing speed of a mobile phone. When an off-screen camera transmits a great amount of data, especially in case of a video call, an overly complex algorithm may increase system power consumption notably, rendering a mobile phone stuttering, worsening user experience.

Embodiments of the present disclosure provide an imaging device, also referred to as a device for collecting an image. The imaging device may be applied to UE such as a mobile phone, a pad, etc. The imaging device, such as a front camera of the mobile phone, is installed under a display having a first polarizer part. The imaging device includes at least one first light sensor element and at least one second light sensor element. The imaging device further includes a second polarizer part. The second polarizer part is provided upstream of the at least one second light sensor element along a direction in which light is incident on the at least one second light sensor element. Polarization orientation of the first polarizer part is at a preset angle to polarization orientation of the second polarizer part. The at least one first light sensor element receives screen light emitted by the display and first polarized ambient light incident through the first polarizer part. The at least one second light sensor element receives the screen light emitted by the display and second polarized ambient light incident through the first polarizer part and the second polarizer part. As the first polarizer part and the second polarizer part may be oriented at a preset included angle, such as 85°, 90°, etc., with respect to each other, a small amount of ambient natural light may pass through the first polarizer part and the second polarizer part, or all natural light is filtered out. Therefore, it may be deemed that only screen light emitted by the display is received by the at least one second light sensor element, such that the screen light may be removed subsequently, leaving only ambient light.

Figure 2:
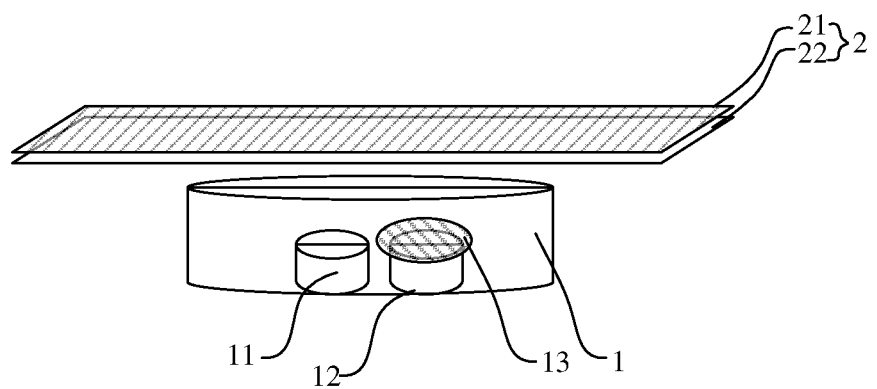
FIG. 2 is a schematic diagram of an imaging device according to an exemplary embodiment.

FIG. 2 is a schematic diagram of an imaging device 1 according to an exemplary embodiment. The imaging device 1 may be a camera, and may be provided under a display 2. For example, the display 2 may be an OLED display. The display 2 may include a first polarizer part 21 and an organic self-luminous layer 22. When a screen of UE is laid flat facing up, the first polarizer part 21 may be located above the organic self-luminous layer 22. The imaging device 1 may be provided under the organic self-luminous layer 22. The imaging device 1 may include a first light sensor element 11 and a second light sensor element 12. The first light sensor element 11 and the second light sensor element 12 may be in same environment. Both light sensor elements may receive same light. The first light sensor element 11 and the second light sensor element 12 may convert, using a photoelectric conversion function of a photoelectric device, a light image on a photosensitive surface into an electric signal proportional to the light image. Compared to a photosensitive element of a point source such as a photodiode, a phototransistor, etc., a light sensor element is a functional device which may divide a light image on a light receiving surface of the light sensor element into a number of small units, and convert the light image into an available electric signal. The first light sensor element 11 and the second light sensor element 12 may be Charge-Coupled Devices (CCDs), Complementary Metal Oxide Semiconductors (CMOS), etc.

The imaging device 1 may further include a second polarizer part 13. The second polarizer part 13 may be provided upstream of the second light sensor element 12 along a direction in which light is incident on the second light sensor element 12. Referring to FIG. 2, that is, the second polarizer part 13 may be provided above the second light sensor element 12. Polarization orientation of the first polarizer part 21 may be at a preset angle with respect to polarization orientation of the second polarizer part 13. The first light sensor element 11 may receive screen light emitted by the display 2 and first polarized ambient light incident through the first polarizer part 21. The second light sensor element 12 may receive the screen light emitted by the display 2, and second polarized ambient light incident through the first polarizer part 21 and the second polarizer part 13. The first polarizer part 21 may be a first polarizer. The second polarizer part 13 may as well be a second polarizer. As described above, polarization orientation of the first polarizer part 21 may be at a preset angle with respect to polarization orientation of the second polarizer part 13. The preset angle may be provided such that the second light sensor element 12 may receive the screen light without natural light, or receive the screen light with a small amount of natural light. A magnitude of the preset angle may be selected as needed, so long as there is no impact on a photographing result of the imaging device 1.

Figure 3:
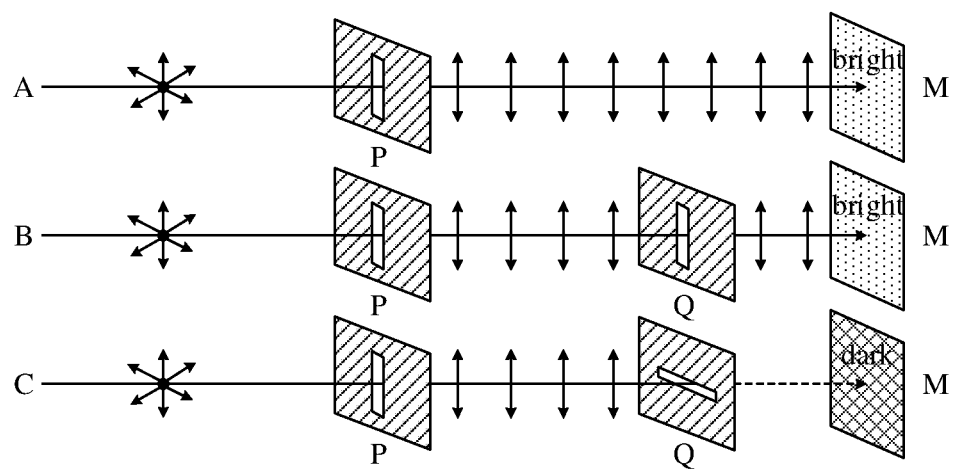
FIG. 3 is a schematic diagram illustrating polarization of an imaging device according to an exemplary embodiment.

FIG. 3 is a schematic diagram illustrating polarization of the imaging device according to an exemplary embodiment. A working principle of the first polarizer part 21 and the second polarizer part 13 is illustrated herein. Referring to FIG. 3, three beams of identical natural light A, B, C may pass through a polarizer P. Polarization orientation of the polarizer P may be vertical. The beam A may become first vertically polarized light vibrating along the vertical direction. Light may be received on a background plate M, which is bright. The beam B may pass through the polarizer P and a polarizer Q. Polarization orientation of the polarizer P and that of the polarizer Q may both be vertical. After passing through the polarizer P, the beam B may become the first vertically polarized light vibrating along the vertical direction. As the first vertically polarized light vibrates along the polarization orientation of the polarizer Q, the first vertically polarized light may pass through the polarizer Q and then become second vertically polarized light, light may still be received on the background plate M, which is bright. The beam C may pass through the polarizer P and a polarizer Q. The polarizer P may be oriented vertically. The polarizer Q may be placed horizontally, with horizontal polarization orientation. After passing through the polarizer P, the beam C may become the first vertically polarized light vibrating along the vertical direction. As the polarization orientation of the polarizer Q is horizontal, only a light wave vibrating horizontally may propagate through the polarizer Q. However, the first vertically polarized light vibrates vertically, and may not be able to pass through the polarizer Q. Therefore, the first vertically polarized light may be filtered out completely after passing through the polarizer Q. No light may be received on the background plate M, which is dark.

Referring to FIG. 2 and FIG. 3, the first polarizer part 21 may be the polarizer P, and the second polarizer part 13 may be the polarizer Q. When the polarization orientation of the first polarizer part 21 is at an angle with respect to the polarization orientation of the second polarizer part 13, after passing through the first polarizer part 21 and the second polarizer part 13 successively, only a negligible amount of ambient light may be received by the second light sensor element 12. Accordingly, the first light sensor element 11 may receive the screen light emitted by the display 2 and first polarized ambient light incident through the first polarizer part 21. The second light sensor element 12 may receive the screen light emitted by the display 2, and second polarized ambient light incident through the first polarizer part 21 and the second polarizer part 13. However, the second polarized ambient light is negligible. Therefore, light received by the second light sensor element 12 may be deemed nearly all screen light.

Receiving ambient light may facilitate improving the photographing result of the imaging device 1. However, screen light may render a picture taken by the imaging device 1 whitish, impacting the photographing result. Therefore, it may be desirable that the imaging device 1 receives ambient light instead of light emitted by the screen. As shown in FIG. 2, the first light sensor element 11 may receive screen light and first polarized ambient light, and the second light sensor element 12 may receive the screen light and second polarized ambient light. However, the second polarized ambient light is negligible. That is, light received by the second light sensor element 12 may be deemed all screen light. Accordingly, the ambient light may be determined according to the screen light and the first polarized ambient light received by the first light sensor element 11 and the screen light received by the second light sensor element 12, thereby acquiring ambient light containing only the first polarized ambient light. Accordingly, a better picture may be taken by the imaging device 1.

In an exemplary embodiment, the preset angle may be 90°. That is, the polarization orientation of the first polarizer part 21 may be perpendicular to the polarization orientation of the second polarizer part 13. Then, according to the principle illustrated in FIG. 3, the first light sensor element 11 may receive the screen light emitted by the display 2 and first polarized ambient light incident through the first polarizer part 21. As the first polarized ambient light vibrates perpendicular to the polarization orientation of the second polarizer part 13, the first polarized ambient light may not be able to propagate through the second polarizer part 13. The second light sensor element 12 may receive no ambient light, but only the screen light emitted by the display 2.

Depending on a process, assembly, etc. during the actual manufacture, the polarization orientations may not be completely perpendicular to each other, but have a certain deviation, or the first polarizer part 21 and the second polarizer part 13 may somehow deviate when being assembled. Such deviations may render a preset angle other than 90°, fluctuating within a range such as 90°±5°. Accordingly, the second light sensor element 12 may receive a small amount of ambient light. However, such a small amount of ambient light may be negligible. In some embodiments, the small amount of ambient light may be regulated or adjusted via software, such as an algorithm, stored in the UE during subsequent photographing to eliminate impact of the small amount of ambient light on the photographing result. The regulation performed using the algorithm may be achieved by producing a good picture acceptable to most users.

In an embodiment, a screen may be of low transmittance, such as around 3%. The imaging device 1 may be provided under the display 2. The imaging device 1 may receive light emitted by the display 2 directly at a short distance. Consequently, a light sensor element may receive much more screen light than ambient light received by the imaging device 1. However, the ambient light is needed for the imaging device 1 to generate an image. The ambient light may tend to vary. In addition, a display may perform display in various scenes, and content to be displayed on the display may not be predicted. Such uncertainty may increase difficulty in regulating the result of an image captured by the imaging device 1 using an algorithm. For example, a complex algorithm may be needed for a massive amount of data. In an embodiment, two light sensor elements may be provided in the imaging device 1. For example, the second polarizer part 13 may be provided on one of the light sensor elements. The second polarizer part 13 may cooperate with the first polarizer part 21, such that the light sensor element provided with the second polarizer part 21 may receive only screen light and no ambient light, or receive only a negligible amount of ambient light. The other light sensor element may receive both ambient light and screen light. Accordingly, subsequently ambient light received by the imaging device 1 may be determined quickly and accurately, greatly lowering complexity of an algorithm for processing an image during photographing, greatly improving a speed of subsequent image processing and precision therein.

Referring again to FIG. 2, the first polarizer part 21 may include a first polarizer, and the second polarizer part 13 may include a second polarizer. The first polarizer may parallel the second polarizer. If the two polarizers do not parallel each other, there may be a great deviation in a preset angle between the polarization orientation of the first polarizer part 21 and the polarization orientation of the second polarizer part 13. Consequently, the second light sensor element 12 may receive too much ambient light, rendering an image captured by the imaging device 1 poor. In addition, to ensure accuracy and reliability of data collected by the two light sensor elements and facilitate subsequent algorithm processing, the first light sensor element 11 and the second light sensor element 12 may be of identical structures, functions, performance, etc. For example, the two light sensor elements may be of the same model, manufactured by the same manufacturer in the same batch, have the same memory, have the same light sensing performance, etc.

In addition, referring to FIG. 2, the first light sensor element 11 and the second light sensor element 12 may be provided inside a housing of the imaging device 1. Both the first light sensor element 11 and the second light sensor element 12 may be located coplanar in an installation plane. The installation plane may parallel the display 2. The first light sensor element 11 and the second light sensor element 12 may be provided side by side in the installation plane. For example, the first light sensor element 11 and the second light sensor element 12 may be provided horizontally, side by side inside the housing of the imaging device 1. Photosensitive surfaces of both light sensor elements may face the display 2, and parallel the display 2. For example, the first light sensor element 11 and the second light sensor element 12 may be provided in such a way as to ensure that the first light sensor element 11 and the second light sensor element 12 receive as much ambient light as possible, and to ensure that the first light sensor element 11 and the second light sensor element 12 are under identical light, lowering a difference in a light sensing mode rendered by how the first light sensor element 11 and the second light sensor element 12 are provided.

Figure 4:
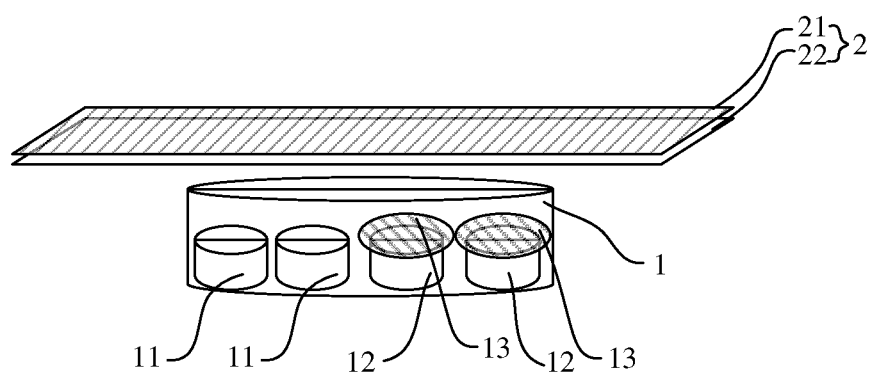
FIG. 4 is a schematic diagram of an imaging device according to an exemplary embodiment.

FIG. 4 is a schematic diagram of an imaging device according to an exemplary embodiment. As shown in FIG. 4, the imaging device 1 may include two first light sensor elements 11 and two second light sensor elements 12 provided coplanar in an installation plane. The installation plane may parallel the display 2. The two first light sensor elements 11 and the two second light sensor elements 12 may be provided side by side in the installation plane. For example, the two first light sensor elements 11 and the two second light sensor elements 12 may be provided horizontally, side by side inside the housing of the imaging device 1. Photosensitive surfaces of the four light sensor elements may all face the display 2, and parallel the display 2. Compared to provision of one first light sensor element 11 and one second light sensor element 12, provision of two first light sensor elements 11 and two second light sensor elements 12 may provide more references, improving reliability. In case one of the two first light sensor elements 11 fails, the other first light sensor element 11 may still be available, avoiding malfunction of the imaging device in case only one first light sensor element 11 is provided and is subsequently broken. When two first light sensor elements 11 and two second light sensor elements 12 are provided, processing such as weighted average, average, etc., may be performed on a collected signal, increasing accuracy of acquired ambient light. In some embodiments, two second light sensor elements 12 may each correspond to a second polarizer part 13. That is, the imaging device 1 may have two second polarizer parts 13. Each second light sensor element 12 may be glued to a second polarizer part 13. Alternatively, two second light sensor elements 12 may share one second polarizer part 13. The two second light sensor elements 12 may be glued respectively to the second polarizer parts 13. The four light sensor elements may be of identical structures, functions, performance, etc. Understandably, there may be three, four, etc., first light sensor elements 11 and three, four, etc., second light sensor elements 12. A number of the first light sensor elements 11 may differ from that of the second light sensor elements 12. For example, two first light sensor elements 11 and three second light sensor elements 12 may be provided. A light sensor element may be provided on a side wall of the housing of the imaging device 1. For example, a photosensitive surface of the light sensor element may be perpendicular to the display. Any number of first light sensor elements 11 and any number of second light sensor elements 12 may be provided in any location as needed.

Embodiments of the present disclosure further provide UE, such as a mobile phone, a pad, etc. The UE may include the imaging device described above. The UE may further include a processor. The processor may be electrically connected respectively to at least one first light sensor element and at least one second light sensor element of the imaging device. The processor may be configured to determine ambient light received by the light sensor elements by processing, using an algorithm, a signal collected by the at least one first light sensor element and the at least one second light sensor element of the imaging device, to ensure that a picture captured by the imaging device is clear and colorful.

Figure 5:
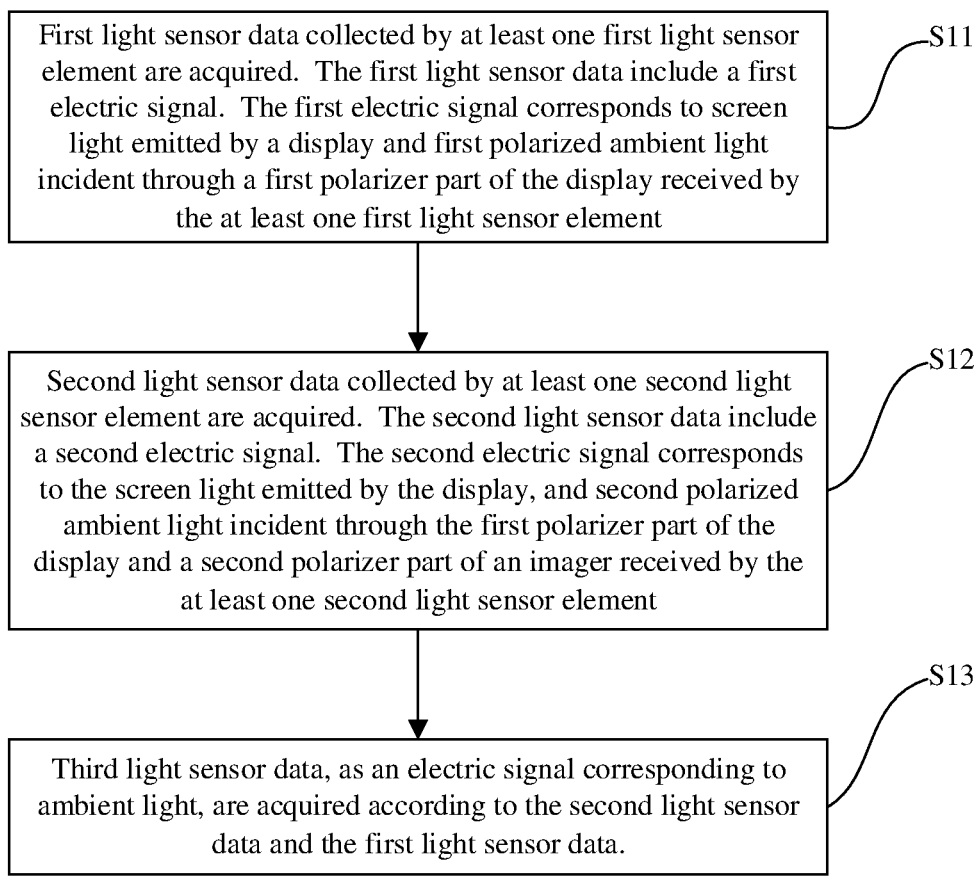
FIG. 5 is a flowchart of a method for acquiring ambient light according to an exemplary embodiment.

FIG. 5 is a flow chart of a method for acquiring ambient light, according to an exemplary embodiment. The method may be applied to an imaging device in which polarization orientation of a first polarizer part is at a preset angle with respect to polarization orientation of a second polarizer part. The method includes the following steps.

In S11, first light sensor data collected by at least one first light sensor element are acquired. The first light sensor data include a first electric signal. The first electric signal corresponds to screen light emitted by a display and first polarized ambient light incident through a first polarizer part of the display received by the at least one first light sensor element.

In S12, second light sensor data collected by at least one second light sensor element are acquired. The second light sensor data include a second electric signal. The second electric signal corresponds to the screen light emitted by the display, and second polarized ambient light incident through the first polarizer part of the display and a second polarizer part of an imaging device received by the at least one second light sensor element.

In S13, third light sensor data, as an electric signal corresponding to ambient light, are acquired according to the second light sensor data and the first light sensor data, for generating an image.

When there are more than one first light sensor element and one second light sensor element, first light sensor data and second light sensor data may be acquired by performing processing such as weighted average, average, etc., on an electric signal acquired by converting a light signal collected by the first light sensor elements and the second light sensor elements.

Figure 6:
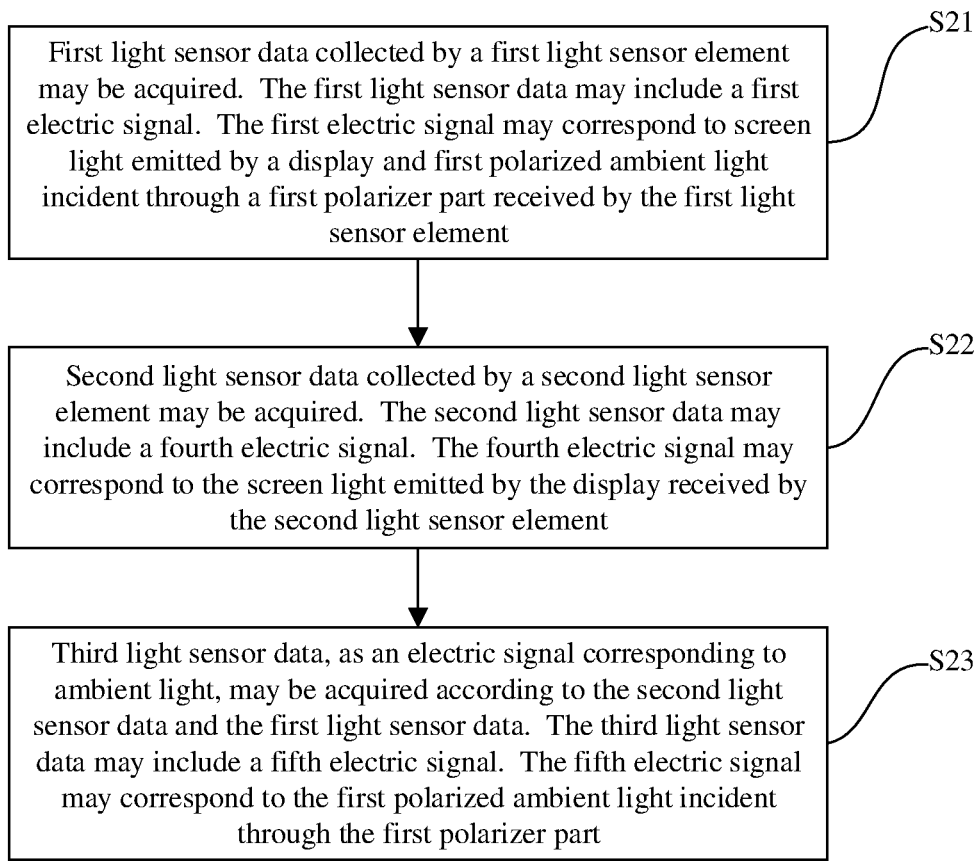
FIG. 6 is a flowchart of a method for acquiring ambient light according to an exemplary embodiment.

FIG. 6 is a flow chart of a method for acquiring ambient light, according to an exemplary embodiment. The method may be applied to an imaging device in which polarization orientation of a first polarizer part is perpendicular to polarization orientation of a second polarizer part. The imaging device may contain one first light sensor element and one second light sensor element. The method may include the following steps.

In S21, first light sensor data collected by a first light sensor element may be acquired. The first light sensor data may include a first electric signal. The first electric signal may correspond to screen light emitted by a display and first polarized ambient light incident through a first polarizer part received by the first light sensor element.

In S22, second light sensor data collected by a second light sensor element may be acquired. The second light sensor data may include a fourth electric signal. The fourth electric signal may correspond to the screen light emitted by the display received by the second light sensor element.

In S23, third light sensor data, as an electric signal corresponding to ambient light, may be acquired according to the second light sensor data and the first light sensor data. The third light sensor data may include a fifth electric signal. The fifth electric signal may correspond to the first polarized ambient light incident through the first polarizer part.

In an embodiment, the third light sensor data, as the electric signal corresponding to the ambient light, may be acquired according to the second light sensor data and the first light sensor data according to a signal processing mode. For example, a person having ordinary skill in the art understands that a display may be refreshed at a refresh rate, such as 60 times per second. The display may go black briefly during a refresh interval between any two neighboring refreshes, in which case the display may emit no screen light. That is, during a refresh interval, a first light sensor element herein may receive pure ambient light, and a second light sensor element herein may receive no light. In such a case, the third light sensor data may include the fifth electric signal corresponding to the first polarized ambient light incident through the first polarizer part, which may be taken as the electric signal corresponding to the ambient light applicable to subsequent image processing.

Figure 7:
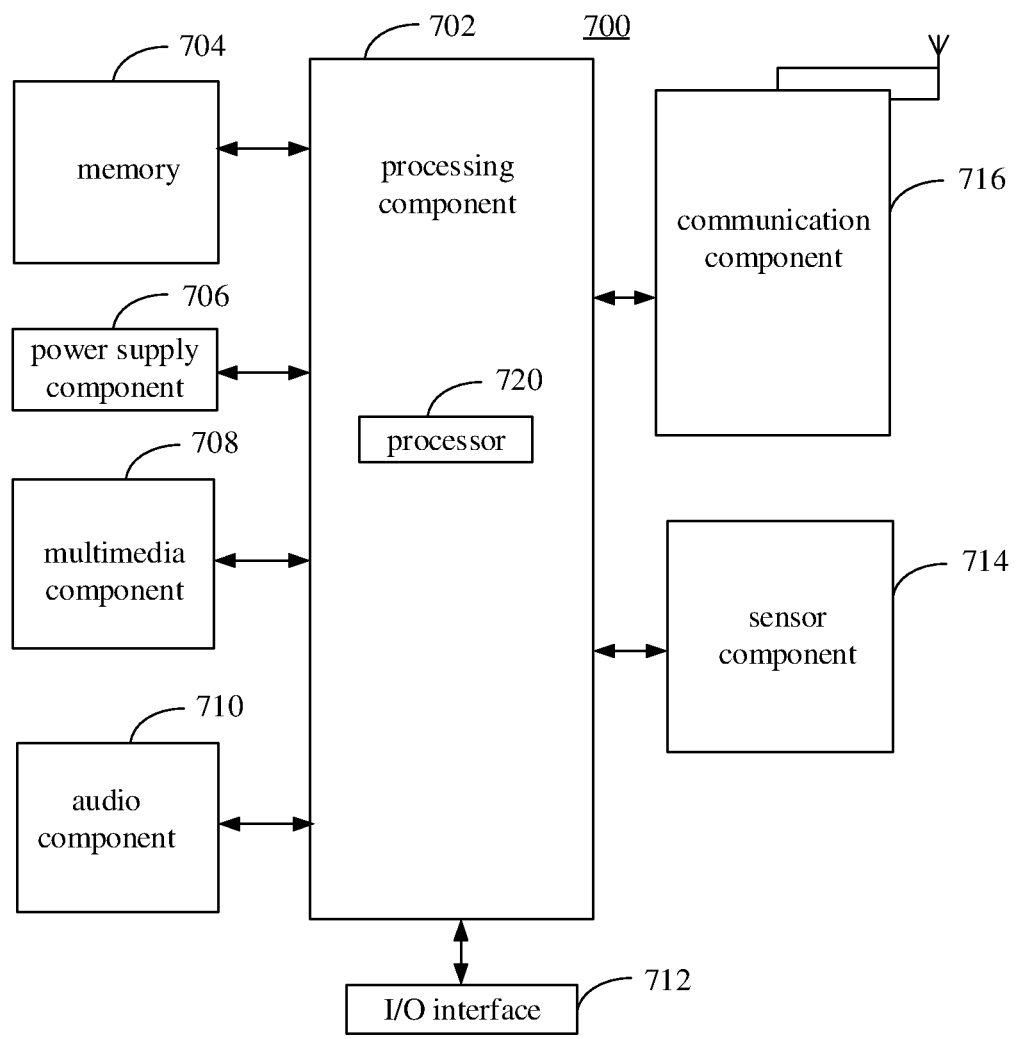
FIG. 7 is a block diagram of a device according to an exemplary embodiment.

FIG. 7 is a block diagram of a device 700 for acquiring ambient light according to an exemplary embodiment. For example, the device 700 may be UE, such as a mobile phone, a computer, digital broadcast equipment, messaging equipment, a gaming console, tablet equipment, medical equipment, fitness equipment, a personal digital assistant, etc.

Referring to FIG. 7, the device 700 may include at least one of a processing component 702, memory 704, a power supply component 706, a multimedia component 708, an audio component 710, an Input/Output (I/O) interface 712, a sensor component 714, a communication component 716, etc.

The processing component 702 may generally control an overall operation of the device 700, such as operations associated with display, a telephone call, data communication, a camera operation, a recording operation, etc. The processing component 702 may include one or more processors 720 to execute instructions so as to complete all or a part of an aforementioned method. In addition, the processing component 702 may include one or more modules to facilitate interaction between the processing component 702 and other components. For example, the processing component 702 may include a multimedia portion to facilitate interaction between the multimedia component 708 and the processing component 702.

The memory 704 may be adapted to storing various types of data to support the operation at the device 700. Examples of such data may include instructions of any application or method adapted to operating on the device 700, contact data, phonebook data, messages, pictures, videos, etc. The memory 704 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 706 may supply electric power to various components of the device 700. The power supply component 706 may include a power management system, one or more power sources, and other components related to generating, managing, and distributing electricity for the device 700.

The multimedia component 708 may include a screen that provides an output interface between the device 700 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 708 may include at least one of a front camera or a rear camera. When the device 700 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 710 may be adapted to outputting and/or inputting an audio signal. For example, the audio component 710 may include a microphone (MIC). When the device 700 is in an operation mode such as a call mode, a recording mode, a voice recognition mode, etc., the MIC may be adapted to receiving an external audio signal. The received audio signal may be further stored in the memory 704 or may be sent via the communication component 716. The audio component 710 may further include a loudspeaker adapted to outputting the audio signal.

The I/O interface 712 may provide an interface between the processing component 702 and a peripheral interface portion. Such a peripheral interface portion may be a keypad, a click wheel, a button, etc. Such a button may include but is not limited to at least one of a homepage button, a volume button, a start button, or a lock button.

The sensor component 714 may include one or more sensors for assessing various states of the device 700. For example, the sensor component 714 may detect an on/off state of the device 700 and relative positioning of components such as the display and the keypad of the device 700. The sensor component 714 may further detect a change in the position of the device 700 or of a component of the device 700, whether there is contact between the device 700 and a user, the orientation or acceleration/deceleration of the device 700, a change in the temperature of the device 700, etc. The sensor component 714 may include a proximity sensor adapted to detecting existence of a nearby object without physical contact. The sensor component 714 may further include an optical sensor such as a Complementary Metal-Oxide-Semiconductor (CMOS) or a Charge-Coupled-Device (CCD) image sensor used in an imaging application. The sensor component 714 may further include an acceleration sensor, a gyroscope sensor, a magnetic sensor, a pressure sensor, a temperature sensor, etc.

The communication component 716 may be adapted to facilitating wired or wireless communication between the device 700 and other equipment. The device 700 may access a wireless network based on a communication standard such as Wi-Fi, 4G, 5G . . . , or a combination thereof. The communication component 716 may broadcast related information or receive a broadcast signal from an external broadcast management system via a broadcast channel. The communication component 716 may include a Near Field Communication (NFC) module for short-range communication. In some embodiments, the communication component 716 may be based on technology such as Radio Frequency Identification (RFID), Infrared Data Association (IrDA), Ultra-Wideband (UWB) technology, Bluetooth (BT), etc.

In an exemplary embodiment, the device 700 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

In an exemplary embodiment, a non-transitory computer-readable storage medium including instructions, such as the memory 704 including instructions, may be provided. The instructions may be executed by the processor 720 of the device 700 to the above described methods. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc. Also for example, the method includes: acquiring first light sensor data collected by at least one first light sensor element, the first light sensor data comprising a first electric signal, the first electric signal corresponding to screen light emitted by a display and first polarized ambient light incident through a first polarizer part of the display received by the at least one first light sensor element; acquiring second light sensor data collected by at least one second light sensor element, the second light sensor data comprising a second electric signal, the second electric signal corresponding to the screen light emitted by the display, and second polarized ambient light incident through the first polarizer part of the display and a second polarizer part of an imaging device received by the at least one second light sensor element; and acquiring, according to the second light sensor data and the first light sensor data, third light sensor data as an electric signal corresponding to ambient light for generating an image.

Other implementations will be apparent to a person having ordinary skill in the art that has considered the specification or practiced the disclosure. The disclosure is intended to cover any variation, use, or adaptation of the disclosure following the general principles of the disclosure and including such departures from the disclosure as come within common knowledge or customary practice in the art. The specification and the embodiments are intended to be exemplary only, with a true scope and spirit of the disclosure being indicated by the appended claims.

The disclosure is not limited to the exact construction that has been described above and illustrated in the accompanying drawings, and that various modifications and changes can be made to the disclosure without departing from the scope of the disclosure. It is intended that the scope of the disclosure is limited only by the appended claims.

What is claimed is:

1. User equipment (UE), comprising:
a processor;
a display having a first polarizer part; and
an imaging device installed under the display and including:
  at least one first light sensor element;
  at least one second light sensor element; and
  a second polarizer part provided upstream of the at least one second light sensor element along a direction in which light is incident on the at least one second light sensor element,
wherein polarization orientation of the first polarizer part is at a preset angle with respect to polarization orientation of the second polarizer part;
the at least one first light sensor element receives screen light emitted by the display and first polarized ambient light incident through the first polarizer part; and
the at least one second light sensor element receives the screen light emitted by the display and second polarized ambient light incident through the first polarizer part and the second polarizer part;
wherein the processor is electrically connected to the at least one first light sensor element and the at least one second light sensor element of the imaging device; and
wherein the processor is configured to:
  acquire first light sensor data collected by the at least one first light sensor element, the first light sensor data comprising a first electric signal, the first electric signal corresponding to the screen light emitted by the display and the first polarized ambient light incident through the first polarizer part of the display;
  acquire second light sensor data collected by the at least one second light sensor element, the second light sensor data comprising a second electric signal, the second electric signal corresponding to the screen light emitted by the display and the second polarized ambient light incident through the first polarizer part of the display and the second polarizer part of the imaging device; and
  acquire, according to the second light sensor data and the first light sensor data, third light sensor data as an electric signal corresponding to ambient light,
  wherein when polarization orientation of the first polarizer part is perpendicular to polarization orientation of the second polarizer part, the third light sensor data comprise the electric signal corresponding to the first polarized ambient light incident through the first polarizer part.

2. The UE of claim 1, wherein the first polarizer part comprises a first polarizer, and the second polarizer part comprises a second polarizer parallel to the first polarizer.

3. The UE of claim 1, wherein:
the at least one first light sensor element and the at least one second light sensor element are located coplanar in an installation plane parallel to the display; and
the at least one first light sensor element and the at least one second light sensor element are provided side by side in the installation plane.

4. The UE of claim 1, wherein the imaging device comprises a camera.

5. The UE of claim 1, wherein the second polarizer part is glued to the at least one second light sensor element.

6. A method for acquiring ambient light, comprising:
acquiring first light sensor data collected by at least one first light sensor element, the first light sensor data comprising a first electric signal, the first electric signal corresponding to screen light emitted by a display and first polarized ambient light incident through a first polarizer part of the display received by the at least one first light sensor element;
acquiring second light sensor data collected by at least one second light sensor element, the second light sensor data comprising a second electric signal, the second electric signal corresponding to the screen light emitted by the display, and second polarized ambient light incident through the first polarizer part of the display and a second polarizer part of an imaging device received by the at least one second light sensor element; and
acquiring, according to the second light sensor data and the first light sensor data, third light sensor data as an electric signal corresponding to the ambient light for generating an image,
wherein when polarization orientation of the first polarizer part is perpendicular to polarization orientation of the second polarizer part, the third light sensor data comprise the electric signal corresponding to the first polarized ambient light incident through the first polarizer part.

7. A non-transitory computer-readable storage medium, having stored thereon instructions that, when executed by a processor of user equipment (UE), cause the UE to:
- acquire first light sensor data collected by at least one first light sensor element, the first light sensor data comprising a first electric signal, the first electric signal corresponding to screen light emitted by a display and first polarized ambient light incident through a first polarizer part of the display received by the at least one first light sensor element;
- acquire second light sensor data collected by at least one second light sensor element, the second light sensor data comprising a second electric signal, the second electric signal corresponding to the screen light emitted by the display, and second polarized ambient light incident through the first polarizer part of the display and a second polarizer part of an imaging device received by the at least one second light sensor element; and
- acquire, according to the second light sensor data and the first light sensor data, third light sensor data as an electric signal corresponding to ambient light for generating an image,
- wherein when polarization orientation of the first polarizer part is perpendicular to polarization orientation of the second polarizer part, the third light sensor data comprise the electric signal corresponding to the first polarized ambient light incident through the first polarizer part.

* * * * *